(12) United States Patent
Tanaka et al.

(10) Patent No.: US 9,858,138 B2
(45) Date of Patent: Jan. 2, 2018

(54) FAILURE FACTOR IDENTIFICATION SUPPORTING APPARATUS AND FAILURE FACTOR IDENTIFICATION SUPPORTING METHOD

(71) Applicant: AZBIL CORPORATION, Chiyoda-ku (JP)

(72) Inventors: Masato Tanaka, Chiyoda-ku (JP); Fumiaki Yamasaki, Chiyoda-ku (JP); Shinichi Koyama, Chiyoda-ku (JP); Motomi Kohata, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 17 days.

(21) Appl. No.: 15/072,099

(22) Filed: Mar. 16, 2016

(65) Prior Publication Data

US 2016/0274964 A1 Sep. 22, 2016

(30) Foreign Application Priority Data

Mar. 19, 2015 (JP) ................................. 2015-055709

(51) Int. Cl.
*G06F 11/00* (2006.01)
*G06F 11/07* (2006.01)
(Continued)

(52) U.S. Cl.
CPC ........ *G06F 11/079* (2013.01); *G05B 23/0281* (2013.01); *G06F 11/0709* (2013.01);
(Continued)

(58) Field of Classification Search
CPC .. G06F 11/327; G06F 11/079; G06F 11/0709; G06F 11/0781; G06F 11/0748
See application file for complete search history.

(56) References Cited

U.S. PATENT DOCUMENTS 7,065,425 B1 * 6/2006 Kay ................. G05B 19/41875
700/110
8,838,413 B2 9/2014 Genta
(Continued)

FOREIGN PATENT DOCUMENTS

| EP | 2 660 675 A1 | 11/2013 |
| EP | 2 749 980 A1 | 7/2014 |
| JP | 2013-191002 | 9/2013 |

OTHER PUBLICATIONS

Extended European Search Report dated Jul. 22, 2016 in Patent Application No. 16161048.0.

*Primary Examiner* — Charles Ehne
(74) *Attorney, Agent, or Firm* — Oblon, McClelland, Maier & Neustadt, L.L.P.

(57) ABSTRACT

A failure factor identification supporting apparatus includes a failure time point information obtaining unit (21) that obtains information regarding a failure occurrence time point at which a failure occurs in a field device (V1) located in a field; an event information obtaining unit (22) that obtains event information regarding, among one or more events that occur in the field, an event that occurs within a certain time range prior to the failure occurrence time point, and an event occurrence time point at which the event occurs; and a failure factor candidate output unit (23) that outputs the event information, obtained by the event information obtaining unit (22), as a failure factor candidate.

7 Claims, 8 Drawing Sheets

(51) Int. Cl.
*G06F 11/32* (2006.01)
*G05B 23/02* (2006.01)

(52) U.S. Cl.
CPC ...... *G06F 11/0736* (2013.01); *G06F 11/0751* (2013.01); *G06F 11/0781* (2013.01); *G06F 11/327* (2013.01); *G05B 2219/25062* (2013.01); *G05B 2219/25428* (2013.01)

(56) References Cited

U.S. PATENT DOCUMENTS

| | | |
|---|---|---|
| 2002/0183866 A1 | 12/2002 | Dean et al. |
| 2003/0191605 A1* | 10/2003 | Fujiyama ............... G06Q 10/06 702/184 |
| 2007/0013232 A1* | 1/2007 | McNally ............... B60L 3/0023 307/10.1 |
| 2007/0213855 A1* | 9/2007 | Furuno .................... E02F 9/26 700/83 |
| 2007/0282777 A1 | 12/2007 | Guralnik et al. |
| 2012/0075659 A1* | 3/2012 | Sawada ............. G03G 15/5058 358/1.14 |
| 2012/0290261 A1 | 11/2012 | Genta |
| 2013/0274899 A1 | 10/2013 | Hamzaoui et al. |
| 2014/0188779 A1 | 7/2014 | Sakuraba |

\* cited by examiner

[FAILURE]
DEVICE    DETAILS OF FAILURE         FAILURE OCCURRENCE
                                              DATE AND TIME
VALVE     VALVE OPENING ERROR      FEB. 18, 2015, 7:00

[EVENT]
DETAILS OF EVENT                           EVENT OCCURRENCE
                                              DATE AND TIME (1) PIPING COMPONENT A REPLACEMENT    FEB. 17, 2015, 21:00
(2) MANUAL VALVE B INSPECTION           FEB. 17, 2015, 15:00

G2

[FAILURE]
| DEVICE | DETAILS OF FAILURE | FAILURE OCCURRENCE DATE AND TIME |
|---|---|---|
| VALVE | VALVE OPENING ERROR | FEB. 18, 2015, 7:00 |

[EVENT]
| DETAILS OF EVENT | EVENT OCCURRENCE DATE AND TIME | EVALUATION VALUE |
|---|---|---|
| (1) PIPING COMPONENT A REPLACEMENT | FEB. 17, 2015, 15:00 | 1.600 |
| (2) MANUAL VALVE B INSPECTION | FEB. 17, 2015, 21:00 | 0.959 |

FAILURE FACTOR IDENTIFICATION SUPPORTING APPARATUS AND FAILURE FACTOR IDENTIFICATION SUPPORTING METHOD

CROSS-REFERENCE TO RELATED APPLICATIONS

The present application claims priority to Japanese Application No. 2015-055709, filed Mar. 19, 2015, the entire contents of which are incorporated herein by reference.

BACKGROUND OF THE INVENTION

1. Field of the Invention

The present invention relates to a failure factor identification supporting apparatus and a failure factor identification supporting method, and more particularly to a failure factor identification supporting apparatus and a failure factor identification supporting method for supporting identification of a factor of a failure that occurs in a field device located in a field.

2. Description of the Related Art

Hitherto, devices (hereinafter referred to as "field devices") such as various sensors and control valves (hereinafter referred to as "valves") for measuring and controlling the flow rate of fluid have been used in chemical plants and factories (hereinafter referred to as "fields").

In periodical maintenance of these field devices, it is preferable to select a field device to be actually maintained, from among these many field devices, for the sake of efficiency and cost. Such periodical maintenance is a necessary work for preventing unavoidable failures such as the aging of the valves.

As an example of the technology of supporting determination of whether maintenance of each field device is necessary, Japanese Unexamined Patent Application Publication No. 2013-191002 proposes the technology of determining that it is necessary to perform maintenance of a field device whose most recent maintenance is performed a number of days ago, the number of days exceeding a preset reference number of days.

Failures of field devices are classified into, for example, those that gradually progress in accordance with the aging of the field devices themselves and those that unexpectedly occur, such as valve opening errors. Among these failures, those that unexpectedly occur are often recognized as failures of the field devices themselves since they are easily recognizable by the operator.

Actually, however, those failures that unexpectedly occur include failures not caused by breakdowns of the field devices themselves where the failures are recognized. For example, a failure that occurs in a field device, such as a valve located on a pipe, may be caused by a man-caused error, such as an error in an operation performed by an operator on a device upstream of the valve.

It is not easy to identify a factor of a failure of a field device, as has been described above. In general, however, because a manufacturer that manufactured a field device and a user who uses that field device are different companies, if a factor of a failure of the field device is ambiguous, a company or a person responsible for the failure may not be identified, leading to a possible business trouble between the manufacturer and the user.

SUMMARY OF THE INVENTION

Accordingly, it is an object of the present invention to provide a failure factor identification supporting apparatus and a failure factor identification supporting method for supporting identification of a factor of a failure of a field device.

In order to achieve the foregoing object, a failure factor identification supporting apparatus according to an aspect of the present invention includes a failure time point information obtaining unit (21), an event information obtaining unit (22), and a failure factor candidate output unit (23, 28). The failure time point information obtaining unit (21) obtains information regarding a failure occurrence time point at which a failure occurs in a field device (V1) located in a field. The event information obtaining unit (22) obtains event information regarding, among one or more events that occur in the field, an event that occurs within a certain time range prior to the failure occurrence time point, and an event occurrence time point at which the event occurs. The failure factor candidate output unit (23, 28) outputs the event information, obtained by the event information obtaining unit (22), as a failure factor candidate.

The failure factor candidate output unit (23) may include a candidate order determining unit (24) that, when the event information obtaining unit (22) obtains a plurality of items of event information, determines order of priority of failure factor candidates corresponding to the plurality of items of event information, based on closeness in terms of time between the failure occurrence time point and each event occurrence time point; and an output unit (30) that outputs the failure factor candidates to which information representing the order of priority is added.

The failure factor identification supporting apparatus may further include a failure device position information obtaining unit (26) that obtains failure device position information indicating a position of the field device (V1) in which the failure occurs, and an event occurrence position information obtaining unit (27) that obtains event occurrence position information indicating a position where each event occurs. The candidate order determining unit (29) may determine the order of priority of the failure factor candidates in accordance with closeness in terms of time between the failure occurrence time point and each event occurrence time point, and closeness in terms of position between the position of the field device in which the failure occurs and each event occurrence position.

The candidate order determining unit (29) may calculate an evaluation value of each event by weighting the closeness in terms of time and the closeness in terms of position, and determine the order of priority of the failure factor candidates, based on the evaluation value.

The candidate order determining unit (29) may include a first quantization unit (29aa) that quantizes the closeness in terms of time based on a predetermined normalization index; a second quantization unit (29ab) that quantizes the closeness in terms of position based on a predetermined normalization index; and an evaluation value calculating unit (29b) that calculates an evaluation value of each event by adding a quantized value of the closeness in terms of time and a quantized value of the closeness in terms of position.

The field device (V1) may be located at any position in a fluid channel system in which fluid flows. Each event may occur at an arbitrary position different from the position of the field device (V1) in the fluid channel system. The failure device position may be determined by a distance from an arbitrary origin in the fluid channel system. The event occurrence position may be determined by a distance from the arbitrary origin.

The field device (301) may be located at any position in a first temperature control system (300a) for controlling temperature. Each event may occur at any position in a second temperature control system (300b to 300d) that is near the first temperature control system. The failure device position may be determined by a distance from an arbitrary reference position in the first temperature control system (300a). The event occurrence position may be determined by a spatial distance from the reference position in the first temperature control system (300a) to the second temperature control system (300b to 300d).

A failure factor identification supporting method according to another aspect of the present invention includes: a failure time point information obtaining step of obtaining, with a failure time point information obtaining unit (21), information regarding a failure occurrence time point at which a failure occurs in a field device (V1) located in a field; an event information obtaining step of obtaining, with an event information obtaining unit (22), event information regarding, among on more events that occurs in the field, an event that occurs within a certain time range prior to the failure occurrence time point, and an event occurrence time point at which the event occurs; and a candidate output step of outputting, with a failure factor candidate output unit (23, 28), the event information, obtained in the event information obtaining step, as a failure factor candidate.

According to the aspects of the present invention, support may be provided for efficiently identifying a factor of a failure in a field device (V1) by providing, as a failure factor candidate, event information regarding an event that occurs within a certain time range prior to a failure occurrence time point, and an event occurrence time point at which the event occurs.

When a plurality of items of event information are obtained, the order of priority of failure factor candidates corresponding to the plurality of items of event information may be determined on the basis of the closeness in terms of time between the failure occurrence time point and each event occurrence time point. Therefore, support may be provided for efficiently identifying a failure factor.

Since the order of priority of the failure factor candidates may be determined by taking into consideration the closeness in terms of position between the failure device position and each event occurrence position in addition to the closeness in terms of time between the failure occurrence time point and each event occurrence time point, support may be provided for efficiently and highly accurately identifying a failure factor.

Since the candidate order determining unit (29) may calculate an evaluation value of each event by weighting the closeness in terms of time and the closeness in terms of position, and determine the order of priority of the failure factor candidates on the basis of the evaluation value, the order of priority of the failure factor candidates may be determined by giving importance to the closeness in terms of time or to the closeness in terms of position.

Since the candidate order determining unit (29) may quantize, with the use of the first quantization unit (29aa), the closeness in terms of time based on a predetermined normalization index, may quantize, with the use of the second quantization unit (29ab), the closeness in terms of position based on a predetermined normalization index, and may calculate an evaluation value of each event by adding a quantized value of the closeness in terms of time and a quantized value of the closeness in terms of position, even in the case of parameters, namely, time and position, that are conceptually different, the order of priority of the failure factor candidates may be determined on the basis of each evaluation value obtained from the quantized values.

Since the failure device position may be determined by a distance from an arbitrary origin in a fluid channel system and the event occurrence position may be determined by a distance from the arbitrary origin, event information on an event that is highly relevant to a factor of a failure in a device may be provided as a failure factor candidate by taking into consideration the closeness in terms of position between the failure device position and each event occurrence position in one fluid channel system.

Since the failure device position may be determined by a distance from an arbitrary reference position in the first temperature control system (300a) and the event occurrence position may be determined by a spatial distance from the reference position in the first temperature control system (300a) to the second temperature control system (300b to 300d), even if there is no continuity in terms of system between the first temperature control system (300a) and the second temperature control system (300b to 300d), event information on an event that is highly relevant to a factor of a failure in a device may be provided as a failure factor candidate by taking into consideration the closeness in terms of spatial position between the failure device position and each event occurrence position.

BRIEF DESCRIPTION OF THE DRAWINGS

FIG. 6 is a diagram illustrating an example of presentation of failure factor candidates according to the first embodiment;

DESCRIPTION OF THE PREFERRED EMBODIMENTS

Embodiments

Hereinafter, embodiments of the present invention will be described with reference to the drawings.

First Embodiment

Configuration of Failure Factor Identification Supporting System

Figure 1:
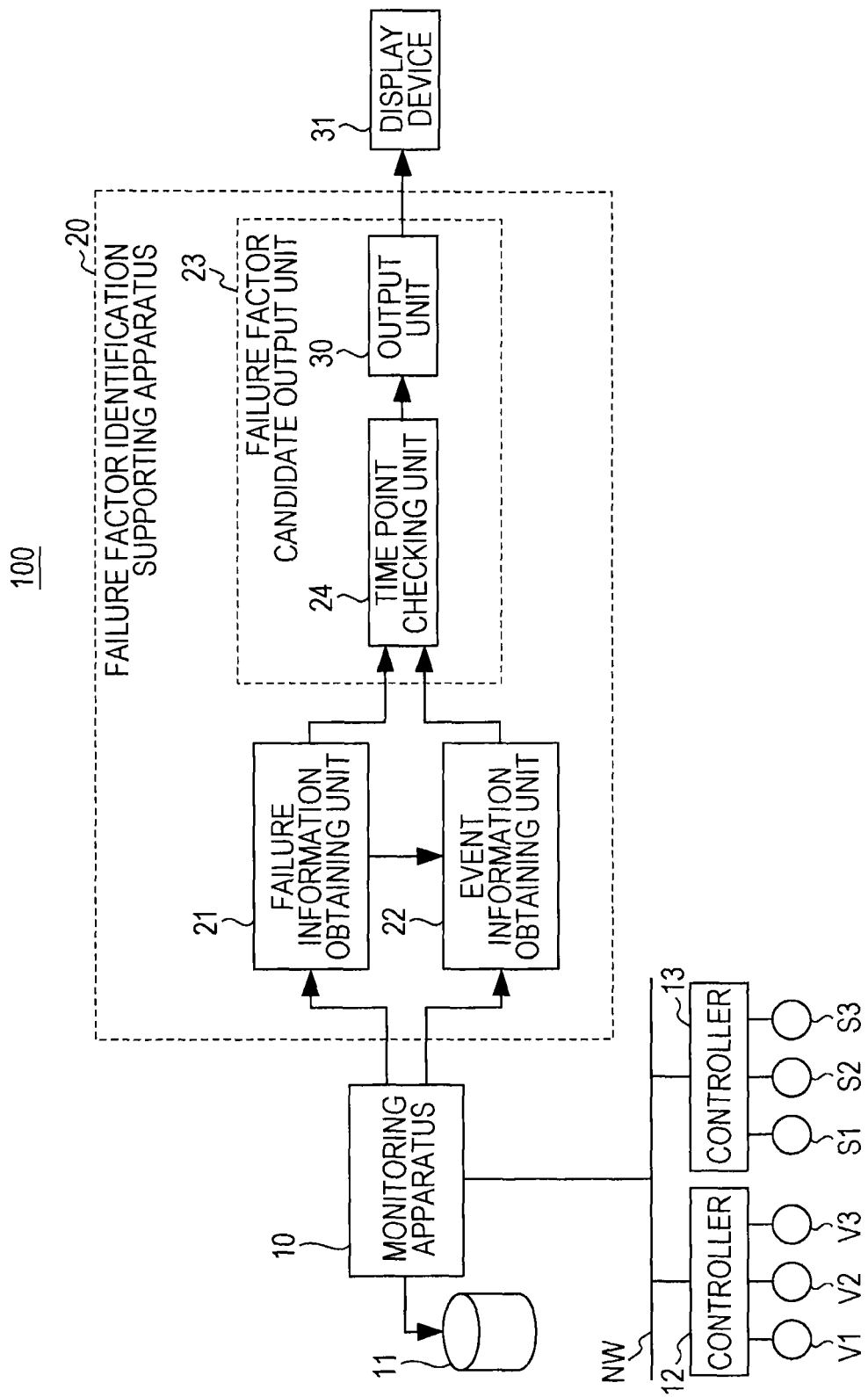
FIG. 1 is a block diagram illustrating the configuration of a failure factor identification supporting system according to a first embodiment.

Referring to FIG. 1, a failure factor identification supporting system 100 according to a first embodiment of the present invention includes a monitoring apparatus 10, a failure factor identification supporting apparatus 20, and a display device 31. The failure factor identification supporting system 100 supports identification of a factor of a failure that occurs in a field device located in a fluid channel system. The term "fluid channel system" refers to a system that includes pipes through which fluid flows, and field devices such as valves V1 to V3 and sensors S1 to S3 located on the pipes. The fluid channel system is monitored by the monitoring apparatus 10 via controllers 12 and 13 and a network NW.

Field devices in this case include, for example, the valves V1 to V3 and the sensors S1 to S3. The valves V1 to V3 have an identical configuration, and the sensors S1 to S3 have an identical configuration. The first embodiment will discuss the following case in which a failure occurs in the valve V1.

Figure 2:
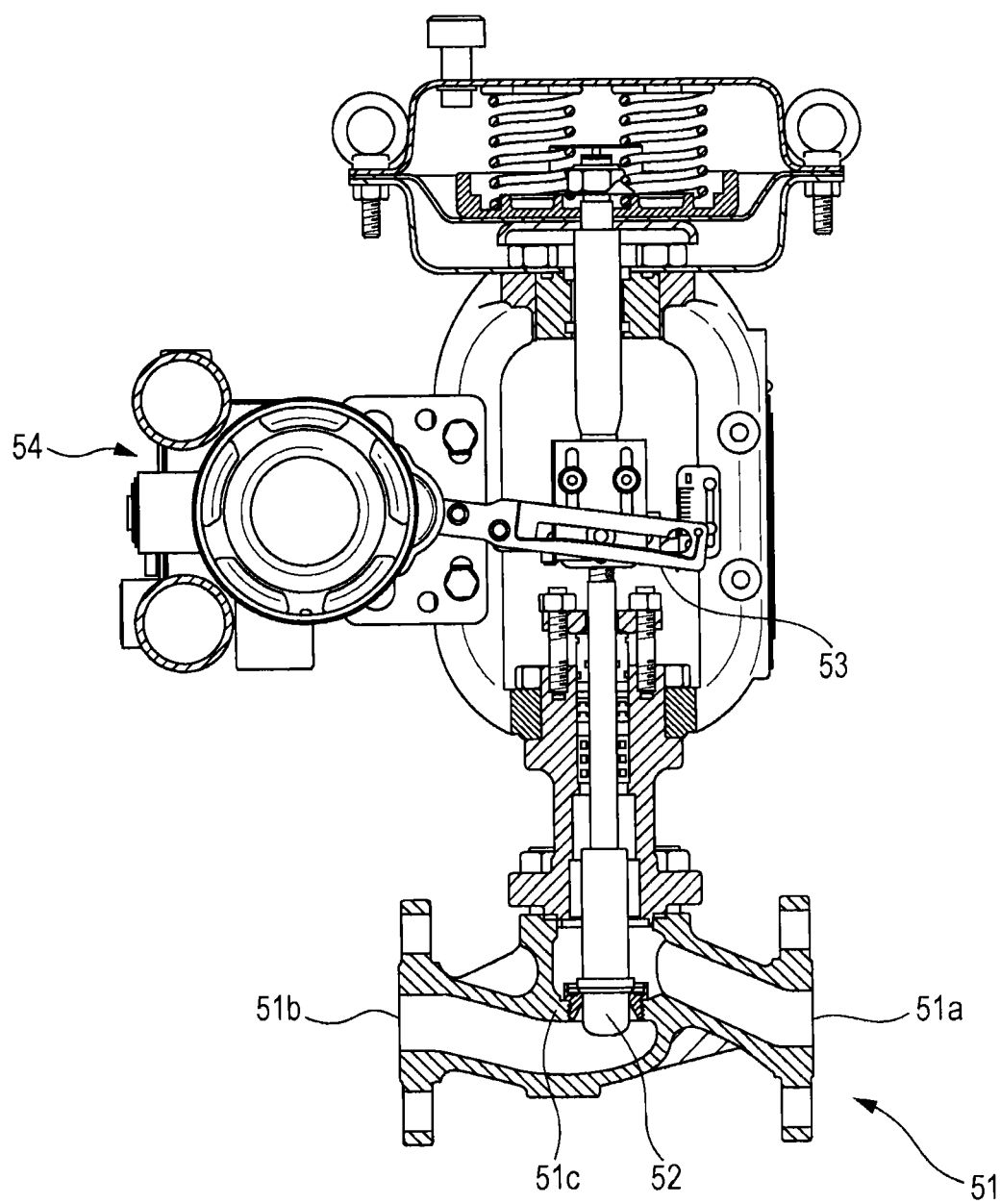
FIG. 2 is an overall external view illustrating the overall configuration of a valve according to the first embodiment.

Referring to FIG. 2, the valve V1 controls the flow rate of fluid that flows from an upstream channel 51a to a downstream channel 51b of a valve body 51, in accordance with the valve opening in accordance with the position in a vertical direction of a valve member 52 with respect to a seat 51c. A positioner 54 in the valve V1 detects the position in a vertical direction of the valve member 52, which is detected via a detection lever 53, and outputs the detected position as valve opening information.

Configuration of Monitoring Apparatus

Figure 3:
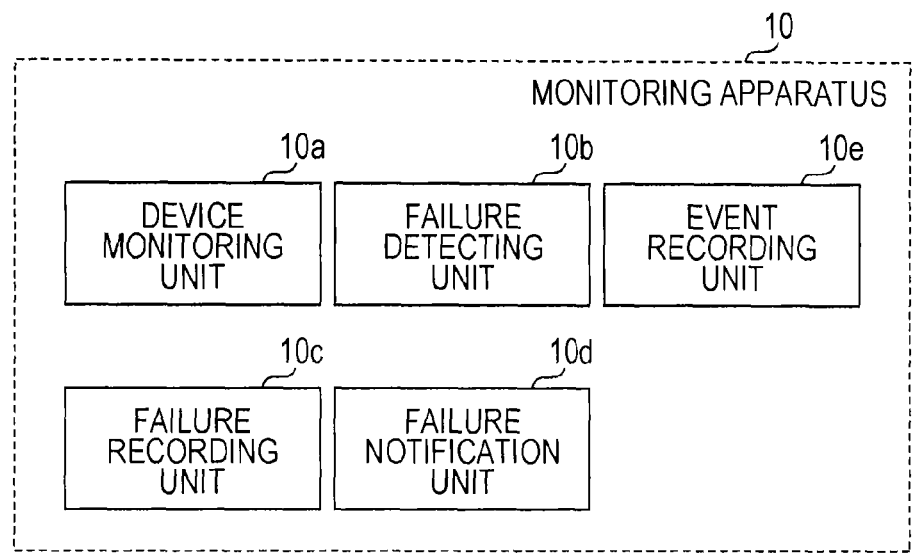
FIG. 3 is a block diagram illustrating the configuration of a monitoring apparatus according to the first embodiment.

Referring to FIG. 3, the monitoring apparatus 10 includes a device monitoring unit 10a, a failure detecting unit 10b, a failure recording unit 10c, a failure notification unit 10d, and an event recording unit 10e.

The device monitoring unit 10a monitors a command, from the controller 12, indicating the valve opening amount of each of the valves V1 to V3, and valve opening information, from the positioner 54, indicating the actual valve opening amount of each of the valves V1 to V3.

The failure detecting unit 10b detects a failure of the valve V1 on the basis of the command indicating the valve opening amount and the valve opening information, which are monitored by the device monitoring unit 10a. Specifically, the failure detecting unit 10b detects that there is a failure in the value V1 when the actual valve opening amount of the valve V1 does not match the valve opening amount indicated in the command from the controller 12 and there is a great difference between the two amounts. A failure of the valve V1 refers to a state in which the valve V1 is incapable of operating normally, such as an operation error including a valve opening error, or a failure including a valve breakage.

Figure 4:
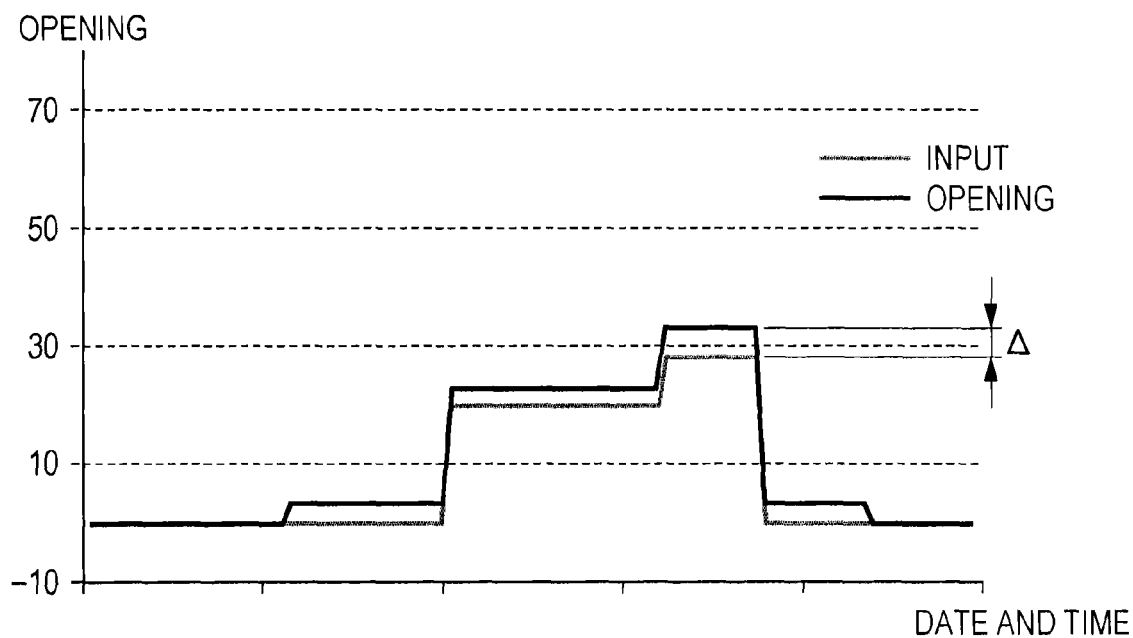
FIG. 4 is a graph illustrating changes in the opening of the valve according to the first embodiment.

FIG. 4 is a graph representing deviation between a valve opening amount indicated in a command for the valve V1, from the controller 12, and the actual valve opening amount indicated by valve opening information when the valve V1 actually operates in response to that command.

Given a command from the controller 12 indicating a valve opening amount of the valve V1, the failure detecting unit 10b obtains a difference Δ between the valve opening amount indicated in the command and the actual valve opening amount of the valve V1. When the difference Δ exceeds a certain threshold th, the failure detecting unit 10b determines that an unexpected valve opening error is occurring in the valve V1.

Figure 5:
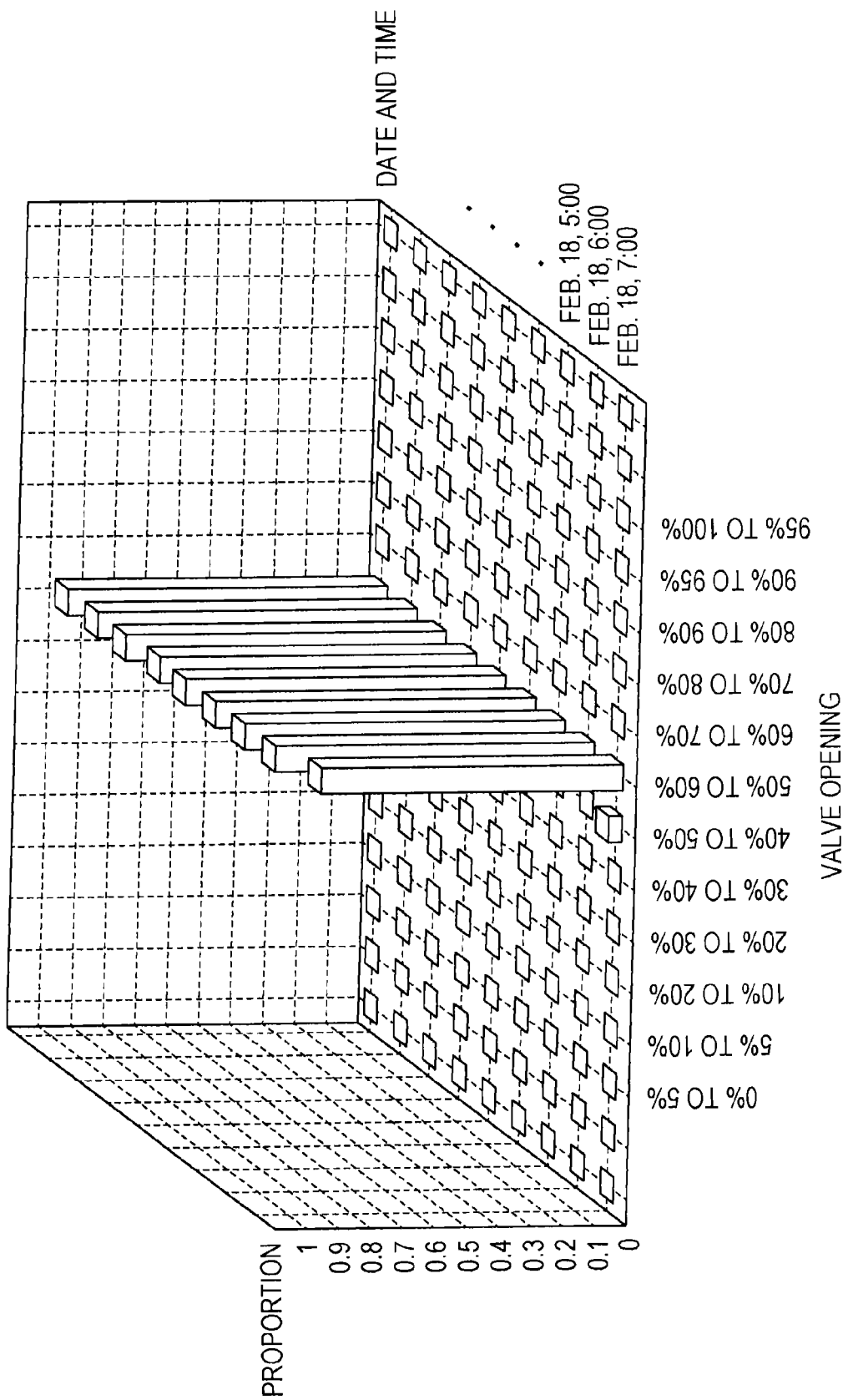
FIG. 5 is a histogram illustrating the distribution of the openings of the valve according to the first embodiment.

FIG. 5 is a histogram indicating the distribution of the valve openings of the valve V1 in chronological order (date and time). This histogram indicates the hourly frequency distribution of valve openings actually measured within a defined time (such as 24 hours) in response to a command indicating a valve opening amount of the valve V1. That is, when the valve V1 is ideally normally operating, the valve opening amounts will be concentrated only within the range of valve opening amounts that match the valve opening amount indicated in the command (50% to 60% in this case).

The unexpected (sudden) occurrence of a valve opening error of the valve V1 means sudden transition from a state where the valve opening amounts are concentrated only around the valve opening amount (50% to 60%) indicated in the command from the controller 12 to a state where the valve opening amounts greatly deviating from the command are actually measured.

On Feb. 18 at 7:00, about 90% of the valve opening amounts are distributed in the area of the valve opening amounts (50% to 60%). At the same time, about 10% are distributed in the area of the valve opening amounts (40% to 50%), which means that the valve opening amounts of the valve V1 deviating from the command from the controller 12 are actually measured. Therefore, the failure detecting unit 10b determines that "February 18, 7:00" is the time point at which the unexpected failure "valve opening error" occurs in the valve V1.

The failure detecting unit 10b generates failure information including information that indicates the specific details of the failure "valve opening error" (hereinafter referred to as "failure details information"), and information that indicates the failure occurrence date and time of the time point "February 18, 7:00" at which the failure occurs (hereinafter referred to as "failure time point information").

The failure recording unit 10c records the failure information (failure details information and failure time point information) on the valve V1, generated by the failure detecting unit 10b, in a database 11. In this case, the failure recording unit 10c records in the database 11 the failure information in the state of a table where the date and time (February 18, 7:00), indicated by the failure time point information, and the failure details information are associated with each other.

Upon detection by the failure detecting unit 10b of the occurrence of an unexpected failure in the valve V1, the failure notification unit 10d notifies the failure factor identification supporting apparatus 20 of a failure detection signal indicating the occurrence of the failure.

When an event of some kind is performed by an operator in the fluid channel system in the field, the event recording unit 10e records in the database 11 information representing the details of that event (hereinafter referred to as "event information"). The term "event" refers to an incident of maintenance performed by the operator on a field device other than the valve V1 that is a device in question where a failure is occurring, an operation of some kind performed by the operator, such as exchanging or repairing a part, or activation of a field device other than the valve V1 by the controller 12 or 13.

The event information includes information that indicates the specific details of the event, such as maintenance or repair performed by the operator (hereinafter referred to as "event details information"), and information that indicates the event occurrence date and time of the time point at which the event occurs (hereinafter referred to as "event time point information").

The event recording unit 10e records in the database 11 the event information, input by the operator who executes the event, in the state of a table where the event details information and the event time point information are associated with each other. Recording of the event information by the event recording unit 10e is done separately and independently of recording of the failure information in the database 11.

The functions of units of the monitoring apparatus 10 described above are realized by installing a computer program (software) in a computer (hardware) including a central processing unit (CPU), memory, interface, and so forth. That is, the functions of the device monitoring unit 10a, failure detecting unit 10b, failure recording unit 10c, failure notification unit 10d, and event recording unit 10e of the monitoring apparatus 10 are realized by cooperation between various hardware resources of the computer and the computer program.

Configuration of Failure Factor Identification Supporting Apparatus

The failure factor identification supporting apparatus 20 includes a failure information obtaining unit 21, an event information obtaining unit 22, and a failure factor candidate output unit 23. The failure factor candidate output unit 23 includes a time point checking unit 24 and an output unit 30.

The failure information obtaining unit 21 obtains failure information on the valve V1 from the monitoring apparatus 10. Specifically, upon notification by the failure notification unit 10d in the monitoring apparatus 10 of a failure detection signal indicating a failure of the valve V1, the failure information obtaining unit 21 requests the monitoring apparatus 10 to send failure information corresponding to the failure detection signal.

On receipt of failure information read from the database 11 via the failure recording unit 10c in the monitoring apparatus 10, the failure information obtaining unit 21 outputs the failure information to the time point checking unit 24 and outputs failure time point information included in the failure information to the event information obtaining unit 22.

The event information obtaining unit 22 obtains event information from the monitoring apparatus 10. Specifically, the event information obtaining unit 22 requests the monitoring apparatus 10 to send event information within a time range that goes back 48 hours from a failure occurrence date and time indicated by the failure time point information received from the failure information obtaining unit 21.

The time range going back 48 hours from the failure occurrence date and time is a time range twice a defined time (24 hours) in aggregating the valve opening distribution (FIG. 5). However, this time range is not limited to 48 hours and may alternatively be set to an arbitrary range.

Upon receipt of a plurality of items of event information read from the database 11 via the event recording unit 10e in the monitoring apparatus 10, the event information obtaining unit 22 outputs the plurality of items of event information to the time point checking unit 24.

The time point checking unit 24 checks the failure time point information (failure occurrence date and time) included in the failure information received from the failure information obtaining unit 21 against two items of event time point information (event occurrence date and time) included in two items of event information received from the event information obtaining unit 22, and compares the failure occurrence date and time with each event occurrence date and time. Specifically, the time point checking unit 24 compares the failure occurrence date and time with each event occurrence date and time, and uses the closeness between the two in terms of time as a determination material for determining a failure factor candidate.

Even when there are ten items of event information within the time range going back 48 hours, if there are two items of event information within a time range where the closeness in terms of time between the failure occurrence date and time and each event occurrence date and time is within, for example, 20 hours, that is, a time range going back, for example, 20 hours from the failure occurrence date and time, the time point checking unit 24 regards these two items of event information as candidates. If there are ten items of event information within the time range going back 48 hours, the time point checking unit 24 may regard all of these items of event information as candidates.

The time point checking unit 24 determines, out of the two items of event information within the time range going back 20 hours from the failure occurrence date and time, first event information whose event occurrence date and time is closest in terms of time to the failure occurrence date and time as a first failure factor candidate, and determines second event information next closest to the failure occurrence date and time as a second failure factor candidate. Thereafter, the time point checking unit 24 generates image data representing a list of failure factor candidates on the basis of the failure information and the first and second items of event information, and supplies the image data to the output unit 30.

The output unit 30 outputs the image data representing a list of failure factor candidates, supplied from the time point checking unit 24, to the display device 31 which is an external device.

The functions of units of the failure factor identification supporting apparatus 20 are realized by installing a computer program (software) in a computer (hardware) including a CPU, memory, interface, and so forth. The functions of the units of the failure factor identification supporting apparatus 20 are realized by cooperation between various hardware resources of the computer and the computer program.

Configuration of Display Device

The display device 31 is a monitor such as a liquid crystal display (LCD), or a display device of a personal computer. The display device 31 receives the image data representing a list of failure factor candidates, output from the output unit 30, and displays and provides a failure factor candidate list screen corresponding to that image data representing the list.

Operation of Failure Factor Identification Supporting Apparatus

Being notified by the failure notification unit 10d in the monitoring apparatus 10 of a failure detection signal indicating a failure of the valve V1, the failure information obtaining unit 21 in the failure factor identification supporting apparatus 20 obtains failure information from the monitoring apparatus 10, outputs failure time point information included in the failure information to the event information obtaining unit 22, and outputs the failure information to the time point checking unit 24 in the failure factor candidate output unit 23.

Upon receipt of the failure time point information from the failure information obtaining unit 21, the event information obtaining unit 22 obtains ten items of event information stored within a time range that goes back 48 hours from Feb. 18, 2015, 7:00, which is the occurrence date and time of the failure in the value V1, indicated by the failure time point information, from the event recording unit 10e in the monitoring apparatus 10. The event information obtaining unit 22 extracts, from among the ten items of event information, two items of event information within the range of past 20 hours as candidates.

For example, the event information obtaining unit 22 determines, as candidates, first event information indicating a first event that takes place about 10 hours before the occurrence date and time of the failure in the valve V1, and second event information indicating a second event that takes place about 16 hours before the occurrence date and time of the failure in the valve V1.

The first event information is about the first event, which is maintenance that replaces part of a piping component A located upstream of a pipe where the valve V1 is located, on Feb. 17, 2015, at 21:00, which is about 10 hours before the failure occurrence date and time.

The second event information is about the second event, which is an inspection of a fixed-valve-opening manual valve B located further upstream of the above-mentioned piping component A, on Feb. 17, 2015, at 15:00, which is about 16 hours before the failure occurrence date and time.

The time point checking unit 24 compares failure time point information (failure occurrence date and time) included in the failure information on the valve V1 received from the failure information obtaining unit 21 with first event time point information (the event occurrence date and time, which is about 10 hours before the failure occurrence date and time) included in the first event information received from the event information obtaining unit 22. Furthermore, the time point checking unit 24 compares the failure time point information (failure occurrence date and time) with second event time point information (the event occurrence date and time, which is about 16 hours before the failure occurrence date and time) included in the second event information.

As a result, the time point checking unit 24 determines the order of priority of the failure factor candidates on the basis of the closeness in terms of time. That is, the time point checking unit 24 determines the first event, which is closer in terms of time to the occurrence date and time of the failure in the valve V1, as a first failure factor candidate, and the second event, which is next closer in terms of time to the failure occurrence date and time, as a second failure factor candidate.

The time point checking unit 24 generates image data representing a list of failure factor candidates in which the first event information and the second event information, to which information representing the order of priority is added, are arranged in the order of the first failure factor candidate and the second failure factor candidate, and supplies the image data to the output unit 30.

The output unit 30 outputs the image data representing a list of failure factor candidates to the display device 31, and the display device 31 displays a failure factor candidate list screen G1 (hereinafter referred to as a "candidate list screen") corresponding to the image data representing the list, as illustrated in FIG. 6.

The candidate list screen G1 presents that a field device in question where a "failure" occurs is a "valve", the details of the failure indicate an "opening distribution error", and the failure occurrence date and time is "Feb. 18, 2015, 7:00".

The candidate list screen G1 also presents that the details of the "first event" determined as the first failure factor candidate indicate "(1) piping component A replacement", and the event occurrence date and time is "Feb. 17, 2015, 21:00". Likewise, the candidate list screen G1 presents that the details of the "second event" determined as the second failure factor candidate indicate "(2) manual valve B inspection", and the event occurrence date and time is "Feb. 17, 2015, 15:00".

Therefore, an operator who checks the candidate list screen G1 can recognize that the first failure factor candidate, which is more likely to be the failure factor of the valve V1, is the first event "(1) piping component A replacement", and the second failure factor candidate is the second event "(2) manual valve B inspection".

In order to check whether the first event "(1) piping component A replacement", which is the first failure factor candidate, is the failure factor of the valve V1, the operator can actually investigate the piping component A. As a result, for example, it may turn out that, because the accuracy of reattaching the piping component A has been low and accordingly turbulence and drift have been caused in the flow of fluid near the valve V1, the occurrence of the turbulence and drift is the failure factor of the opening distribution error of the valve V1. In such a case, the efficiency in identifying the failure factor of the valve V1 is particularly improved.

However, as a result of the actual investigation of the piping component A, even when it turns out that the first event "piping component A replacement" is not the failure factor of the valve V1, since the failure factor identification supporting apparatus 20 does not automatically detect the failure factor but simply provides candidates of the failure factor, the fact remains that the failure factor identification supporting apparatus 20 supports identification of the failure factor.

Even if the physical causal relationship between the valve V1 where a failure occurs and a peripheral device such as the piping component A or the manual valve B located nearby is unclear, when the occurrence date and time of the failure in the valve V1 is checked against the event occurrence date and time of the piping component A and the event occurrence date and time of the manual valve B, the failure factor identification supporting apparatus 20 can provide failure factor candidates based on the order of priority with reference to the closeness in terms of time between the occurrence dates and times.

Since the failure factor identification supporting apparatus 20 extracts and provides failure factor candidates only in accordance with the closeness in terms of time between the failure occurrence date and time and the event occurrence date and time, even if the failure factor of the valve V1 is unconceivable by the operator because it has no direct causal relationship with the valve V1, the failure factor identification supporting apparatus 20 can efficiently support identification of the failure factor.

Second Embodiment

Configuration of Failure Factor Identification Supporting System

Figure 7:
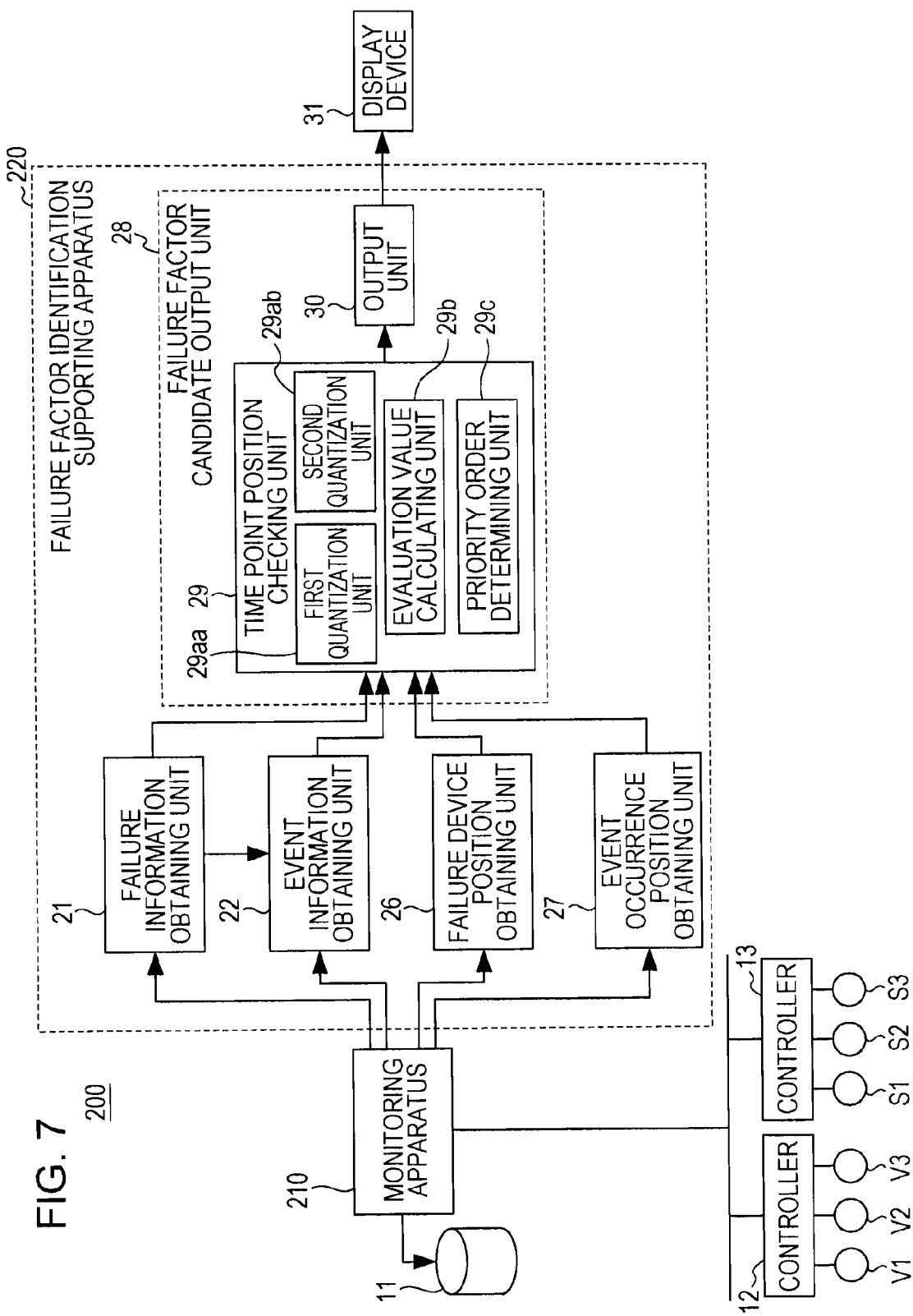
FIG. 7 is a block diagram illustrating the configuration of a failure factor identification supporting system according to a second embodiment.

Referring to FIG. 7, a failure factor identification supporting system 200 according to a second embodiment includes a monitoring apparatus 210, a failure factor identification supporting apparatus 220, and the display device 31. In the second embodiment, the failure information obtaining unit 21, event information obtaining unit 22, output unit 30, and display device 31 which are the same elements as those in the failure factor identification supporting system 100 illustrated in FIG. 1 are denoted by the same reference numerals, and detailed descriptions thereof are omitted.

Configuration of Monitoring Apparatus

Figures 8, 9:
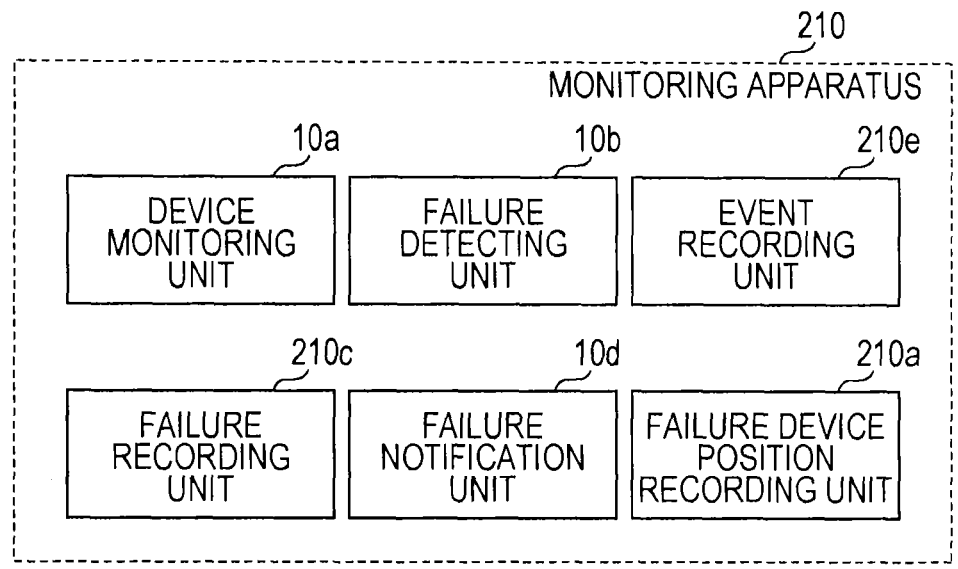
FIG. 8 is a block diagram illustrating the configuration of a monitoring apparatus according to the second embodiment.
FIG. 9 is a diagram an example of presentation of failure factor candidates according to the second embodiment.

Referring to FIG. 8, the monitoring apparatus 210 includes, in addition to the device monitoring unit 10a, failure detecting unit 10b, and failure notification unit 10d of the monitoring apparatus 10 of the first embodiment, a failure device position recording unit 210a, a failure recording unit 210c, and an event recording unit 210e. The same elements as those of the monitoring apparatus 10 are denoted by the same reference numerals, and detailed descriptions thereof are omitted.

The failure device position recording unit 210a pre-records position information on the valve V1 where an unexpected failure occurs (hereinafter referred to as "failure device position information") in association with the above-described failure information on the valve V1 (failure details information and failure time point information) in the database 11. Failure device position information is instrumentation position information representing a piping position at which the valve V1 is located.

For example, when the position of a tank located the most upstream of the piping of a fluid channel system where a fluid α flows serves as the upstream origin and when the valve V1 is located at a position that is 45 m ahead of the upstream origin toward the downstream side of the piping, the failure device position information on the valve V1 is information that indicates the distance "45 m".

The event recording unit 210e records, in addition to the above-described event information (event details information and event time point information), information that indicates the occurrence position of the event (a piping position at which another field device where the event occurs is located) (hereinafter referred to as "event occurrence position information") in the database 11. The event occurrence position information is also input by the operator who performs the event.

For example, when the position of a tank located the most upstream of the piping of the fluid channel system of the fluid α serves as the upstream origin and when the piping component A is located at a position that is 43 m ahead of the upstream origin toward the downstream side of the piping, the event occurrence position information is information that indicates the distance "43 m".

Configuration of Failure Factor Identification Supporting Apparatus

The failure factor identification supporting apparatus 220 includes the failure information obtaining unit 21, the event information obtaining unit 22, a failure device position information obtaining unit 26, an event occurrence position information obtaining unit 27, and a failure factor candidate output unit 28. The failure factor candidate output unit 28 includes a time point position checking unit 29 and the output unit 30. The same elements as those of the failure factor identification supporting apparatus 20 are denoted by the same reference numerals, and detailed descriptions thereof are omitted.

Like the first embodiment, the failure information obtaining unit 21 and the event information obtaining unit 22 output failure information on the valve V1 and a plurality of items of event information, obtained from the monitoring apparatus 10, to the time point position checking unit 29 in the failure factor candidate output unit 28.

The failure device position information obtaining unit 26 obtains failure device position information on the valve V1 where an unexpected failure occurs, from the monitoring apparatus 10. The event occurrence position information obtaining unit 27 obtains event occurrence position information corresponding to event information obtained by the event information obtaining unit 22, from the monitoring apparatus 10.

The time point position checking unit 29 includes a first quantization unit 29aa, a second quantization unit 29ab, an evaluation value calculating unit 29b, and a priority order determining unit 29c.

The first quantization unit 29aa quantizes the closeness in terms of time between the occurrence date and time of the failure in the valve V1 and each event occurrence date and time on the basis of a predetermined normalization index. The second quantization unit 29ab quantizes the closeness in terms of position between the failure device position of the valve V1 and each event occurrence position on the basis of a predetermined normalization index.

The evaluation value calculating unit 29b weights a quantized value obtained by the first quantization unit 29aa as a result of quantizing the closeness in terms of time and a quantized value obtained by the second quantization unit 29ab as a result of quantizing the closeness in terms of position using a certain weight coefficient, and adds the weighted quantized values, thereby calculating an evaluation value of each event.

The priority order determining unit 29c determines the order of priority of items of event information serving as candidates of a failure factor on the basis of the evaluation value of each event, calculated by the evaluation value calculating unit 29b. The priority order determining unit 29c generates image data representing a list of failure factor candidates, in which the order of priority is indicated, and outputs the generated image data to the output unit 30. The output unit 30 outputs the image data representing the list to the display device 31.

Operation of Failure Factor Identification Supporting Apparatus

Being notified by the monitoring apparatus 10 of a failure detection signal, the failure information obtaining unit 21 in the failure factor identification supporting apparatus 220 obtains failure information from the monitoring apparatus 10, outputs failure time point information included in the failure information to the event information obtaining unit 22, and outputs the failure information to the time point position checking unit 29 in the failure factor candidate output unit 28.

Upon receipt of the failure time point information from the failure information obtaining unit 21, the event information obtaining unit 22 obtains, for example, two items of event information stored within a time range that goes back 48 hours from Feb. 18, 2015, 7:00, which is indicated by the failure time point information, from the monitoring apparatus 10.

For example, the event information obtaining unit 22 obtains first event information corresponding to a first event (piping component A replacement) that takes place about 16 hours before the occurrence date and time of the failure in the valve V1, and second event information corresponding to a second event (manual valve B inspection) that takes place about 10 hours before the occurrence date and time of the failure in the valve V1.

In the first embodiment, the first event takes place about 10 hours before the failure occurrence date and time, and the second event takes place about 16 hours before the failure occurrence date and time. However, the second embodiment will discuss an exemplary case where, as has been described above, the first event takes place about 16 hours before the failure occurrence date and time, and the second event takes place about 10 hours before the failure occurrence date and time. Note that the event details of the first event information and the second event information are the same as those in the first embodiment.

In response to notification of a failure detection signal indicating a failure of the valve V1, the failure device position information obtaining unit 26 requests the monitoring apparatus 10 to send failure device position information, obtains failure device position information on the valve V1 via the failure recording unit 210c in the monitoring apparatus 10, and outputs the failure device position information to the time point position checking unit 29.

The event occurrence position information obtaining unit 27 requests the monitoring apparatus 10 to send event occurrence position information corresponding to the first event information and the second event information, obtained by the event information obtaining unit 22. When the event occurrence position information obtaining unit 27 obtains first event occurrence position information and second event occurrence position information corresponding to the first event information and the second event information, respectively, via the event recording unit 210b in the monitoring apparatus 10, the event occurrence position information obtaining unit 27 outputs these items of event occurrence position information to the time point position checking unit 29.

Specifically, the position of a tank located the most upstream of the piping of the fluid channel system of the fluid α serves as the upstream origin, and the event occurrence position information obtaining unit 27 obtains the first event occurrence position information (distance "43 m") indicating that the piping component A is located at a position that is 43 m ahead of the upstream origin toward the downstream side of the piping.

Also, the position of a tank located the most upstream of the piping of the fluid channel system of the fluid α serves as the upstream origin, and the event occurrence position information obtaining unit 27 obtains the second event occurrence position information (distance "20 m") indicating that the manual valve B is located at a position that is 20 m ahead of the upstream origin toward the downstream side of the piping.

In this case, the piping component A is located at a position that is upstream by 2 m (45 m-43 m) of the position where the valve V1 is located, and the manual valve B is located at a position that is upstream by 25 m (45 m-20 m) of the position of the valve V1.

The first quantization unit 29aa in the time point position checking unit 29 quantizes a time point interval Pt1 indicating a temporal interval between the occurrence date and time of the failure in the valve V1 and the first event occurrence date and time of the first event (piping component A replacement) using a predetermined normalization index (48 hours in this case) as described below by equation (1):

$$Pt1=(48\ h-16\ h)/48\ h=0.667 \quad (1)$$

The first quantization unit 29aa also quantizes a time point interval Pt2 indicating a temporal interval between the occurrence date and time of the failure in the valve V1 and the second event occurrence date and time of the second event (manual valve B inspection) using the predetermined normalization index (48 hours in this case) as described below by equation (2):

$$Pt2=(48\ h-10\ h)/48\ h=0.792 \quad (2)$$

where the normalization index is a time corresponding to twice the predetermined time (24 hours) in aggregating the valve opening distribution (FIG. 5).

According to equations (1) and (2), the value of the time point interval Pt2 is greater than the value of the time point interval Pt1. Thus, it is clear that the second event occurrence date and time of the second event (manual valve B inspection) is temporally closer to the occurrence date and time of the failure in the valve V1 than the first event occurrence date and time of the first event (piping component A replacement) is.

Next, the second quantization unit 29ab in the time point position checking unit 29 quantizes a position interval Pd1 indicating a position interval between the failure device position (45 m) of the valve V1 and the first event occurrence position (43 m) of the first event (piping component A replacement) using a predetermined normalization index (30 m in this case) as described below by equation (3):

$$Pd1=(30\ m-(45\ m-43\ m))/30\ m=0.933 \quad (3)$$

The second quantization unit 29ab also quantizes a position interval Pd2 indicating a position interval between the failure device position of the valve V1 and the second event occurrence position (20 m) of the second event (manual valve B inspection) using the predetermined normalization index (30 m in this case) as described below by equation (4):

$$Pd2=(30\ m-(45\ m-20\ m))/30\ m=0.167 \quad (4)$$

Although the normalization index is set to a distance of 30 m in this case, the normalization index may be set to an arbitrary distance as long as the value of a numerator in each of equations (3) and (4) does not become negative. When the distance between the failure device position of the valve V1 and each event occurrence position is greater than 30 m, that is, when the value of a numerator in each of equations (3) and (4) becomes negative, the values of the position intervals Pd1 and Pd2 are set to "0.0", which is the lower limit value.

According to equations (3) and (4), the value of the position interval Pd1 is greater than the value of the position interval Pd2. Thus, it is clear that the first event occurrence position of the first event (piping component A replacement) is positionally closer to the failure device position of the valve V1 than the second event occurrence position of the second event (manual valve B inspection) is.

The evaluation value calculating unit 29b in the time point position checking unit 29 weights quantized values obtained as a result of quantizing the closeness in terms of time using equations (1) and (2) and quantized values obtained as a result of quantizing the closeness in terms of position using equations (3) and (4) by using certain weight coefficients p and q, respectively, and adds the weighted quantized values, as described below in equations (5) and (6). Accordingly, the evaluation value calculating unit 29b can calculate an evaluation value P1 of the first event and an evaluation value P2 of the second event:

$$P1=p \cdot Pt1+q \cdot Pd1 \quad (5)$$

$$P2=p \cdot Pt2+q \cdot Pd2 \quad (6)$$

When the weight coefficients p and q are 1, for example (p=1 and q=1), the evaluation value P1 of the first event and the evaluation value P2 of the second event will be as described below by equations (7) and (8):

$$P1=1 \times 0.667+1 \times 0.933=1.600 \quad (7)$$

$$P2=1 \times 0.792+1 \times 0.167=0.959 \quad (8)$$

Accordingly, it is clear that the evaluation value P1 of the first event is greater than the evaluation value P2 of the second event. Although the weight coefficients p and q are simply 1 (p=1 and q-1) in the above case, if the closeness in terms of time is given greater importance, the weight coefficient p is set to a value greater than q; and, if the closeness in terms of position is given greater importance, the weight coefficient q is set to a value greater than p. These weight coefficients p and q may be set to arbitrary values.

If only the closeness in terms of time is taken into consideration, because the value of the time point interval Pt2 is greater than the value of the time point interval Pt1, the priority order determining unit 29c in the time point position checking unit 29 assigns a higher priority to the second event (manual valve B inspection) with respect to the occurrence date and time of the failure in the valve V1. However, when the evaluation values P1 and P2 which take into consideration the closeness in terms of position in addition to the closeness in terms of time are compared with each other, the priority order determining unit 29c may assign a higher priority to the first event (piping component A replacement) for which the evaluation value P1 is calculated.

As described above, the time point position checking unit 29 can calculate the evaluation values P1 and P2 by quantizing both the closeness in terms of time between the failure occurrence date and time and each event occurrence date and time and the closeness in terms of position between the failure device position and each event occurrence position and adding the quantized values, and determine the order of priority of failure factor candidates in descending order of the evaluation values P1 and P2.

The closeness in terms of position between the failure device position of the valve V1 and each event occurrence position corresponds to each of the distances Pd1 and Pd2 between the failure device position and each event occurrence position in the piping, which are continuous in terms of an identical fluid channel system. Thus, the time point position checking unit 29 can provide event information on an event that is highly relevant to the failure factor of the valve V1 as a failure factor candidate.

The priority order determining unit 29c in the time point position checking unit 29 generates image data representing a list of failure factor candidates in which the first event information and the second event information are arranged in the determined order of priority, and supplies the image data to the output unit 30.

The output unit 30 outputs the image data representing a list of failure factor candidates to the display device 31, and the display device 31 displays a failure factor candidate list screen G2 (hereinafter referred to as a "candidate list screen") corresponding to the image data representing the list, as illustrated in FIG. 9.

The candidate list screen G2 presents that a device in question where a "failure" occurs is a "valve", the details of the failure indicate an "opening distribution error", and the failure occurrence date and time is "Feb. 18, 2015, 7:00".

The candidate list screen G2 also presents that the details of the "first event" determined as the first failure factor candidate indicate "(1) piping component A replacement", and the event occurrence date and time is "Feb. 17, 2015, 15:00". Likewise, the candidate list screen G2 presents that the details of the "second event" determined as the second failure factor candidate indicate "(2) manual valve B inspection", and the event occurrence date and time is "Feb. 17, 2015, 21:00".

Furthermore, the candidate list screen G2 displays the evaluation values P1 and P2 ("1.600" and "0.959") indicating the basis for determining the order of priority of the first failure factor candidate and the second failure factor candidate.

Therefore, an operator who checks the candidate list screen G2 can recognize that the first failure factor candidate, which is more likely to be the failure factor of the valve V1 where a failure occurs, is the first event "(1) piping component A replacement", and the second failure factor candidate is the second event "(2) manual valve B inspection".

As has been described above, since the failure factor identification supporting apparatus 220 determines the order of priority of failure factor candidates while taking into consideration the closeness in terms of position between the valve V1 and each event, in addition to the closeness in terms of time between the valve V1 and each event, the accuracy of identifying that an event serving as a failure factor candidate is the actual failure factor can be further improved, and efficient identification of the failure factor can be supported.

Third Embodiment

Figure 10:
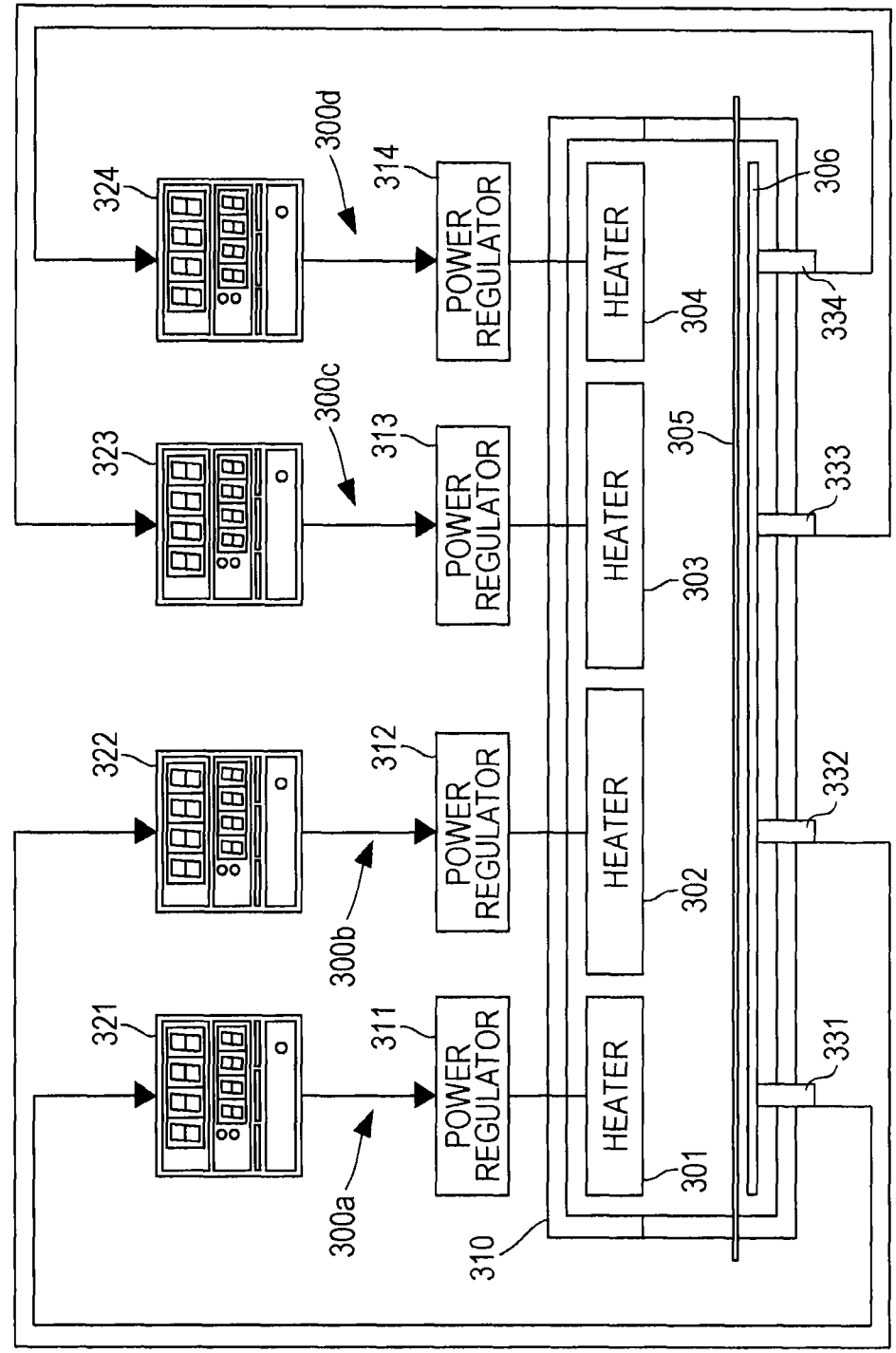
FIG. 10 is a block diagram illustrating the configuration of a failure factor identification supporting system according to a third embodiment.

FIG. 10 is a block diagram illustrating the overall configuration of a temperature control system 300 according to a third embodiment, to which the failure factor identification supporting system 200 according to the second embodiment is applied. The following case will be described by way of example in which a heater 301, which is one element of a field device included in the temperature control system 300, is a target where a failure is occurring in the failure factor identification supporting system 200.

The temperature control system 300 includes a box-shaped chamber 310; heaters 301 to 304 that are arranged in a horizontal direction in internal space of the chamber 310, having a slight gap therebetween and not overlapping one another; a plate-shaped to-be-heated member 305 located, in the internal space of the chamber 310, facing the heaters 301 to 304 while being vertically separated from the heaters 301 to 304; a plate-shaped table 306 for placing the to-be-heated member 305; temperature sensors 331 to 334 fixed to a bottom face of the table 306 so as to face the heaters 301 to 304; power regulators 311 to 314 located outside the chamber 310 and electrically connected to the heaters 301 to 304; and temperature controllers 321 to 324 that are connected to output terminals of the temperature sensors 331 to 334 and that control the power regulators 311 to 314.

In this case, the temperature controller 321, power regulator 311, heater 301, to-be-heated member 305, table 306, and temperature sensor 331 configure a temperature control system 300a for controlling temperature. Likewise, temperature control systems 300b to 300d are configured. That is, the temperature control system 300 includes four temperature control systems 300a to 300d that have continuity in terms of system. However, there is no continuity in terms of system or no direct relevance between the temperature control systems 300a to 300d.

When an unexpected failure occurs in the heater 301, the failure device position information obtaining unit 26 obtains failure device position information on the heater 301 from the monitoring apparatus 10, and outputs the failure device position information to the time point position checking unit 29.

The event occurrence position information obtaining unit 27 obtains not only the event occurrence position of an event performed on another field device (such as the power regulator 311, temperature controller 321, or temperature sensor 331) in the temperature control system 300a including the heater 301, but also the event occurrence position of each of the heaters 302 to 304 in the other temperature control systems 300b to 300d that are within a distance range spatially close to the heater 301. The reason for the above is that, although there is no continuity in terms of system or no direct relevance, it is likely that the heater 301 is influenced by heat transfer of the heaters 302 to 304 which are spatially close to the heater 301.

For example, when an event that is namely maintenance is performed on each of the heaters 302 and 303 in the other temperature control systems 300b and 300c within a time range going back 48 hours from the occurrence date and time of the failure in the heater 301, the event occurrence position information obtaining unit 27 requests the monitoring apparatus 10 to send event occurrence position information on the heaters 302 and 303, and outputs the event occurrence position information to the time point position checking unit 29.

The failure device position of the heater 301 is the position where the heater 301 is located in the temperature control system 300a. The event occurrence positions of the events on the heaters 302 and 303 are determined by the spatial distances from the position where the heater 301 is located in the temperature control system 300a, which serves as a reference position, to the heaters 302 and 303 in the temperature control systems 300b and 300c.

Therefore, event occurrence position information is such that, when the position where the heater 301 is located in the chamber 310 is defined as a reference position (0 m), among the arranged heaters 301 to 304, the horizontal position where the heater 302 is located is, for example, 0.5 m from the reference position, and the horizontal position where the heater 303 is located is, for example, 2 m from the reference position. Therefore, it is clear in this case that the heater 302 is located at a position that is spatially closest to the heater 301.

In addition to the closeness in terms of time between the failure occurrence time point of the heater 301 and each of the event occurrence time points of the heaters 302 and 303, the time point position checking unit 29 takes into consideration the closeness in terms of spatial position between the failure device position of the heater 301 and each of the event occurrence positions of the heaters 302 and 303, and calculates the above-mentioned evaluation values P1 and P2, thereby determining the order of priority of the events on the heaters 302 and 303 serving as failure factor candidates.

Therefore, even when there is no continuity in terms of system among the temperature control systems 300a, 300b, and 300c, event information on an event performed on the heater 302 which is highly related to the failure factor of the heater 301 can be provided as a key failure factor candidate.

Other Embodiments

Although the above-described first embodiment has discussed the case where the time point checking unit 24 in the failure factor candidate output unit 23 provides failure factor candidates on the candidate list screen G1 in which event information whose event occurrence date and time closer in terms of time to the failure occurrence date and time is assigned a higher priority, the present invention is not limited to this case. A plurality of failure factor candidates simply listed on a candidate list screen may be provided, without assigning priorities to a plurality of items of event information received from the event information obtaining unit 22.

Although the above-described first embodiment has discussed the case where the closeness in terms of time is determined every hour, the present invention is not limited to this case. The closeness in terms of time may be determined at various other time intervals, such as every day or every week.

Furthermore, although the above-described second embodiment has discussed the case where the failure device position of the valve V1 or each event occurrence position is determined by a distance from the upstream origin in the fluid channel system, the present invention is not limited to this case. The failure device position or each event occurrence position may be determined by a distance from the downstream origin.

Furthermore, although the above-described first and second embodiments have discussed the cases where, when a failure occurs in the valve V1, an event performed on another device other than the valve V1 serves as a failure factor candidate, the present invention is not limited to these cases. An event such as maintenance performed on the valve V1 itself may serve as a failure factor candidate. In this case, the failure device position of the valve V1 and the event occurrence position of the valve V1 are the same, and hence the distance between the two positions is simply Pd1=1.0.

Furthermore, although the above-described first to third embodiments have discussed the cases where the fluid channel system and the temperature control system serve as systems to which the present invention is applicable, the present invention is not limited to these cases. The present invention is applicable to various systems such as a pressure control system, and candidates of a factor of a failure in a field device in such systems may be provided.

What is claimed is:

1. A failure factor identification supporting apparatus, comprising:
    processing circuitry configured to
        obtain information regarding a failure occurrence time point at which a failure occurs in a field device located in a field;
        obtain event information regarding, among one or more events that occur in the field, an event that occurs within a certain time range prior to the failure occurrence time point, and an event occurrence time point at which the event occurs; and
    output the obtained event information as a failure factor candidate,
    wherein the processing circuitry is further configured to, when the plurality of items of event information are obtained, determine an order of priority of failure factor candidates corresponding to the plurality of items of event information, based on closeness in terms of time between the failure occurrence time point and each event occurrence time point, and output the failure factor candidates to which information representing the order of priority is added.

2. The failure factor identification supporting apparatus according to claim 1, wherein the processing circuitry is further configured to
    obtain failure device position information indicating a position of the field device in which the failure occurs, and
    obtain event occurrence position information indicating a position where each event occurs, and
    determine the order of priority of the failure factor candidates in accordance with closeness in terms of time between the failure occurrence time point and each event occurrence time point, and closeness in terms of position between the position of the field device in which the failure occurs and each event occurrence position.

3. The failure factor identification supporting apparatus according to claim 2, wherein the processing circuitry is further configured to
    calculate an evaluation value of each event by weighting the closeness in terms of time and the closeness in terms of position, and
    determine the order of priority of the failure factor candidates, based on the evaluation value.

4. The failure factor identification supporting apparatus according to claim 3, wherein the processing circuitry is further configured to
    quantize the closeness in terms of time based on a predetermined normalization index;
    quantize the closeness in terms of position based on a predetermined normalization index; and
    calculate an evaluation value of each event by adding a quantized value of the closeness in teens of time and a quantized value of the closeness in terms of position.

5. The failure factor identification supporting apparatus according to claim 2, wherein:
the field device is located at any position in a fluid channel system in which fluid flows,
each event occurs at an arbitrary position different from the position of the field device in the fluid channel system,
the failure device position is determined by a distance from an arbitrary origin in the fluid channel system, and
the event occurrence position is determined by a distance from the arbitrary origin.

6. The failure factor identification supporting apparatus according to claim 1, wherein:
the field device is located at any position in a first temperature control system for controlling temperature,
each event occurs at any position in a second temperature control system that is near the first temperature control system,
the failure device position is determined by a distance from an arbitrary reference position in the first temperature control system, and
the event occurrence position is determined by a spatial distance from the reference position in the first temperature control system to the second temperature control system.

7. A failure factor identification supporting method, comprising:
obtaining, with a failure time point information obtaining unit, information regarding a failure occurrence time point at which a failure occurs in a field device located in a field;
obtaining, with an event information obtaining unit, event information regarding, among on more events that occur in the field, an event that occurs within a certain time range prior to the failure occurrence time point, and an event occurrence time point at which the event occurs; and
outputting, with a failure factor candidate output unit, the obtained event information as a failure factor candidate, wherein the outputting step includes, when the plurality of items of event information are obtained, determining an order of priority of failure factor candidates corresponding to the plurality of items of event information, based on closeness in terms of time between the failure occurrence time point and each event occurrence time point, and outputting the failure factor candidates to which information representing the order of priority is added.

* * * * *